(12) United States Patent
Haubs et al.

(10) Patent No.: US 8,742,065 B2
(45) Date of Patent: *Jun. 3, 2014

(54) OXYMETHYLENE POLYMERS, PROCESS FOR THE PREPARATION THEREOF AND USE THEREOF

(75) Inventors: Michael Haubs, Bad Kreuznach (DE); Michael Hoffmockel, Niedernhausen (DE); Jürgen Lingnau, Mainz-Laubenheim (DE); Robert Gronner, Earlanger, KY (US); Horst Roeschert, Ober-Hilbersheim (DE)

(73) Assignee: Ticona GmbH, Kelsterbach (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/482,158

(22) Filed: May 29, 2012

(65) Prior Publication Data

US 2012/0232246 A1    Sep. 13, 2012

Related U.S. Application Data

(63) Continuation of application No. 12/423,682, filed on Apr. 14, 2009, now Pat. No. 8,188,211.

(60) Provisional application No. 61/045,324, filed on Apr. 16, 2008.

(51) Int. Cl.
C08G 65/34       (2006.01)

(52) U.S. Cl.
USPC ........................................................ 528/425

(58) Field of Classification Search
USPC ........................................................ 528/425
See application file for complete search history.

(56) References Cited

U.S. PATENT DOCUMENTS

| | | | |
|---|---|---|---|
| 2,505,125 A * | 4/1950 | Heinz List | 366/80 |
| 2,993,025 A * | 7/1961 | Alsup et al. | 524/343 |
| 3,161,616 A | 12/1964 | Brown et al. | |
| 3,161,617 A * | 12/1964 | Wagner et al. | 528/243 |
| 3,269,988 A * | 8/1966 | Braude et al. | 528/241 |
| 3,340,234 A * | 9/1967 | Schweitzer et al. | 525/400 |
| 3,346,663 A * | 10/1967 | Jaacks et al. | 525/58 |
| 3,380,966 A * | 4/1968 | Fouts | 525/410 |
| 3,393,179 A | 7/1968 | Leverett et al. | |
| 3,642,940 A | 2/1972 | Burg et al. | |
| 3,865,284 A | 2/1975 | Kazama et al. | |
| 3,998,791 A | 12/1976 | Radici et al. | |
| 4,097,453 A | 6/1978 | Radici et al. | |
| 4,169,867 A | 10/1979 | Burg et al. | |
| 4,195,158 A | 3/1980 | Burg et al. | |
| 4,431,794 A * | 2/1984 | Sadlowski et al. | 528/232 |
| 4,493,751 A | 1/1985 | Cherdron et al. | |
| 4,517,319 A | 5/1985 | Reske et al. | |
| 4,683,267 A | 7/1987 | Linder et al. | |
| 4,780,498 A | 10/1988 | Goerrissen et al. | |
| 4,804,716 A | 2/1989 | Flexman, Jr. | |
| 4,845,161 A | 7/1989 | Richardson | |
| 4,929,712 A | 5/1990 | Sugiyama et al. | |
| 4,968,756 A | 11/1990 | Silvis et al. | |
| 4,975,518 A | 12/1990 | Broussard et al. | |
| 4,975,519 A | 12/1990 | Yang et al. | |
| 4,978,725 A | 12/1990 | Reske et al. | |
| 4,996,253 A | 2/1991 | Mulholland | |
| 5,004,784 A | 4/1991 | Huynh-Ba | |
| 5,004,798 A | 4/1991 | Broussard et al. | |
| 5,039,741 A | 8/1991 | Burg et al. | |
| 5,043,398 A | 8/1991 | Auerbach et al. | |
| 5,143,982 A | 9/1992 | Niino | |
| 5,144,005 A | 9/1992 | Sextro et al. | |
| 5,183,860 A | 2/1993 | Kashihara | |
| 5,288,840 A | 2/1994 | Morishita et al. | |
| 5,292,824 A | 3/1994 | Nagai et al. | |
| 5,310,822 A | 5/1994 | Kielhorn-Bayer et al. | |
| 5,326,846 A | 7/1994 | Nagai et al. | |
| 5,380,724 A | 1/1995 | Zubovics et al. | |
| 5,530,061 A | 6/1996 | Sanada et al. | |
| 5,541,284 A | 7/1996 | Arnoldi et al. | |
| 5,587,449 A * | 12/1996 | Fleischer et al. | 528/232 |
| 5,599,860 A | 2/1997 | Memon et al. | |
| 5,608,030 A * | 3/1997 | Hoffmockel et al. | 528/232 |
| 5,834,542 A | 11/1998 | Kielhorn-Bayer et al. | |
| 5,852,135 A | 12/1998 | Kanai et al. | |
| 5,859,131 A | 1/1999 | Ishiura et al. | |
| 5,866,670 A | 2/1999 | Nakai et al. | |
| 5,910,540 A | 6/1999 | Takahashi | |
| 5,942,593 A | 8/1999 | Pudleiner et al. | |

(Continued)

FOREIGN PATENT DOCUMENTS

| AU | 21487/70 | 4/1972 |
|---|---|---|
| EP | 0137305 A2 | 4/1985 |

(Continued)

OTHER PUBLICATIONS

Molecular Weight Distribution of Polyoxymethylene, J. Macromol. Sci.—Chem, A1(8), pp. 1519-1529, Dec. 1967.*

Braun et al., "Influences of structural parameters on the dynamic mechanical properties of polyacetals", *Die Arrgewandte Makromolekulare Chemie 228* (1995), pp. 185-200 (Nr. 4030).

Chujo et al., "Reversible Gelation of Polyoxazoline by Means of Diels-Alder Reaction", Macromolecules (1990), 23, 2636-2641.

Kawaguchi et al, "Tensile Behavior of Glass-Fiber-Filled Polyacetal: Influence of the Functional Groups of Polymer Matrices", Journal of Applied Polymer Science, vol. 107, pp. 667-673 (2008).

(Continued)

*Primary Examiner* — James J Seidleck
*Assistant Examiner* — Peter A Salamon
(74) *Attorney, Agent, or Firm* — Dority & Manning, PA

(57) ABSTRACT

Oxymethylene polymers having a bimodal distribution or having a distribution of higher modality and having a targeted content of a low molecular weight fraction of from 1 to 5 percent by mass are described. Moldings of these polymers are distinguished by high low-temperature notched impact strength associated with a high modulus of elasticity.

14 Claims, No Drawings

(56) References Cited

U.S. PATENT DOCUMENTS

| | | | |
|---|---|---|---|
| 5,959,036 A | 9/1999 | Yahiro et al. | |
| 5,962,623 A | 10/1999 | Eckardt et al. | |
| 6,187,859 B1 | 2/2001 | Humphrey et al. | |
| 6,271,302 B1 | 8/2001 | Matsushima | |
| 6,388,049 B1 * | 5/2002 | Yokoyama et al. | 528/425 |
| 6,506,850 B1 | 1/2003 | Tamimura et al. | |
| 6,512,047 B2 | 1/2003 | Kim et al. | |
| 6,559,266 B2 | 5/2003 | Kaufhold et al. | |
| 6,706,807 B2 | 3/2004 | Kaufhold et al. | |
| 6,821,630 B2 | 11/2004 | Takada et al. | |
| 7,008,986 B2 | 3/2006 | Dames et al. | |
| 7,138,175 B2 | 11/2006 | Saito | |
| 7,169,887 B2 | 1/2007 | Papke | |
| 7,223,809 B2 | 5/2007 | Notogiacomo | |
| 7,645,822 B2 | 1/2010 | Assmann et al. | |
| 7,745,548 B2 | 6/2010 | Zierer et al. | |
| 7,812,110 B2 * | 10/2010 | Haubs et al. | 528/230 |
| 7,829,610 B2 | 11/2010 | Papke | |
| 7,858,202 B2 | 12/2010 | Prigandt et al. | |
| 7,863,393 B2 | 1/2011 | Assmann et al. | |
| 7,915,350 B2 | 3/2011 | Schmalz et al. | |
| 7,943,726 B2 * | 5/2011 | Haubs et al. | 528/365 |
| 8,008,390 B2 | 8/2011 | Gunnewig et al. | |
| 2005/0043492 A1 | 2/2005 | Chin et al. | |
| 2005/0107513 A1 | 5/2005 | Papke | |
| 2005/0156351 A1 | 7/2005 | Straus et al. | |
| 2006/0111507 A1 | 5/2006 | Papke | |
| 2006/0175325 A1 | 8/2006 | Day | |
| 2006/0252912 A1 * | 11/2006 | Hoffmockel et al. | 528/425 |
| 2007/0010633 A1 | 1/2007 | Park et al. | |
| 2007/0049685 A1 | 3/2007 | Hansel et al. | |
| 2007/0154727 A1 | 7/2007 | Ziegler et al. | |
| 2007/0179273 A1 * | 8/2007 | Haubs et al. | 528/425 |
| 2007/0185308 A1 * | 8/2007 | Haubs et al. | 528/425 |
| 2007/0202332 A1 | 8/2007 | Gunnewig et al. | |
| 2008/0214748 A1 * | 9/2008 | Assmann et al. | 526/68 |
| 2009/0151707 A1 | 6/2009 | Davis et al. | |
| 2009/0189314 A1 | 7/2009 | Peerlings et al. | |
| 2009/0220719 A1 | 9/2009 | Klug et al. | |
| 2009/0264583 A1 | 10/2009 | Kurz et al. | |
| 2009/0283931 A1 | 11/2009 | Pfeiffer et al. | |

FOREIGN PATENT DOCUMENTS

| | | |
|---|---|---|
| EP | 0276080 A1 | 7/1988 |
| EP | 0400827 A2 | 12/1990 |
| EP | 0354802 B1 | 7/1993 |
| EP | 0420564 B1 | 10/1994 |
| EP | 0992541 B1 | 9/2004 |
| GB | 1017244 | 7/1962 |
| GB | 1009881 | 11/1965 |
| GB | 1331829 | 9/1973 |
| GB | 1335806 | 10/1973 |
| GB | 1377083 | 12/1974 |
| GB | 1444789 | 8/1976 |
| GB | 1524410 | 9/1978 |
| GB | 1524440 | 9/1978 |
| GB | 1590549 | 6/1981 |
| JP | 03-284675 | 12/1991 |
| JP | 04-114003 | 4/1992 |
| JP | 04-145114 | 5/1992 |
| JP | 05-509255 | 3/1993 |
| JP | 07-010871 | 1/1995 |
| JP | 07-033766 | 2/1995 |
| JP | 2000-154181 | 6/2000 |
| JP | 2003-147161 | 5/2003 |
| JP | 2004-204051 | 7/2004 |
| WO | WO 2004/065444 A1 | 8/2004 |
| WO | WO 2005/012380 A1 | 2/2005 |
| WO | WO 2006/089915 A1 | 8/2006 |
| WO | WO 2006/105918 A1 | 10/2006 |
| WO | WO 2007/073873 A1 | 7/2007 |
| WO | WO 2007/073874 A1 | 7/2007 |

OTHER PUBLICATIONS

Ishida, "Polymerization of Formaldehyde and the Physical Properties of the Polymerization Products, I", *Journal of Applied Polymer Science*, vol. 26, pp. 2743-2750 (1981).

Mehrabzadeh et al., "Impact Modification of Polyacetal by Thermoplastic Elastomer Polyurethane", *Journal of Applied Polymer Science*, vol. 84, 2573-2582 (2002).

Product Data Sheet for Lucel: N109-02, N109-LD, N109-WR.

* cited by examiner

OXYMETHYLENE POLYMERS, PROCESS FOR THE PREPARATION THEREOF AND USE THEREOF

RELATED APPLICATIONS

The present application is a continuation application of U.S. patent application having Ser. No. 12/423,682 with filing date of Apr. 14, 2009, which is based on and claims priority to U.S. Provisional Patent Application No. 61/045,324, filed on Apr. 16, 2008 and claims priority to or the benefit of German Patent Application No. 102008018967.7-44, filed on Apr. 16, 2008.

The present invention relates to novel oxymethylene polymers for the production of moldings having excellent low-temperature notched impact strength and a high modulus of elasticity, the use thereof and a process for the preparation of the oxymethylene polymers.

Oxymethylene polymers are obtainable by the anionic polymerization of formaldehyde. In order to ensure the thermal stability of the polymers which is required for practical use, the polymers thus obtained are endcapped by stable terminal groups, for example by introduction of terminal ether or ester groups. Examples of this are to be found in DE-B-1,158,709, U.S. Pat. Nos. 3,998,791, 3,393,179,DE-A-1,445,255, DE-B-1,158,709, U.S. Pat. Nos. 4,097,453 and 3,161,616.

While oxymethylene polymers endcapped with terminal ester groups are degraded at elevated temperatures or in basic environments, oxymethylene polymers endcapped with terminal ether groups are distinguished by a higher chemical stability. However, the processes proposed to date for the preparation of these polymers comprise a separate step for endcapping the polymers (cf. for example U.S. Pat. No. 3,161,616), and the high molecular weights required for practical uses are not achieved in this way. Moreover, this polymer-analogous reaction does not take place quantitatively, which leads to low yields and/or a product which still has a high degradation rate.

The homopolymers thus obtained by anionic polymerization of formaldehyde have a monomodal molecular weight distribution (Polymer Degradation and Stability, 92 (2007) 2181-2189).

Alternatively, a stable oxymethylene polymer can be prepared by subjecting monomers forming formaldehyde units, preferably trioxane, to cationic copolymerization with small amounts of comonomers and thereby incorporating small amounts of oxyalkylene units substantially randomly into the chain. The molecular weight regulation is effected by transfer agents, as a rule dialkyl formals. By degradation of the unstable ends up to the first oxyalkylene unit in an alkali medium (hydrolysis), copolymers which have stable terminal hydroxyalkyl groups (from the comonomer) and terminal alkyl groups (from the transfer agent) are thus obtained. Thus, for example, EP-A-504,405 discloses oxymethylene polymers which contain small proportions of other oxyalkylene units, in particular of oxyethylene units, in addition to oxymethylene units and which have a low content of terminal formyl groups. The proportion of the other oxyalkylene units, based on the proportion of the oxymethylene units, is from 0.07 to 0.5 mol %. On exceeding said content of oxyalkylene units, polymers having insufficient heat stability and hot water stability form. The polymers are prepared in the presence of a selected amount of a perfluoroalkanesulfonic acid (derivative) as a catalyst, and monomers having a low content of water and of formic acid are used. The deactivation of the polymerization mixture is effected by addition of selected crystalline basic adsorbents, for example of oxides or of hydroxides of alkali metals or alkaline earth metals. Accordingly, it is also possible to prepare copolymers having a relatively high content of oxyalkylene units.

Under said polymerization conditions, the polymer formed is precipitated in the early phase of the polymerization—regardless of whether the mass polymerization, a polymerization in the presence of an inert solvent or a suspension polymerization is carried out. This subsequently always leads to a bimodal molecular weight distribution: a maximum in the curve of the molecular weight distribution is typically present at comparatively low molecular weights, for example at from 2,000 to 5,000 Dalton; a further maximum in the curve of the molecular weight distribution is typically present at comparatively high molecular weights, for example at 50,000-100,000 Dalton. The mass fraction of the low molecular weight fraction is from 5 to 15%. The low molecular weight fraction can be determined by gel permeation chromatography (GPC). These significant amounts of the low molecular weight fraction have a not inconsiderable influence on the mechanical properties of the polymer.

On the other hand, oxymethylene polymers which have a monomodal molecular weight distribution and are distinguished by improved impact strength and flexural modulus of elasticity are also known (EP 0 716 105 A1) from the cationic polymerization of trioxane. The improvement is achieved by establishing a monomodal molar mass distribution, a comonomer content of from 0.3 to 0.9 mol % and a melt volume rate of from 1 to 5 g/10 min.

The preparation of these polymers is effected by polymerization in the homogeneous phase at elevated temperature. As a result, secondary reactions occur to a greater extent and the polymer yield in the preparation is limited.

Finally, oxymethylene polymers are known which are prepared by mixing linear low molecular weight oxymethylene fractions with oxymethylene polymers prepared conventionally by cationic polymerization (U.S. Pat. No. 6,388,049 B1). This mixing is effected in the range of from 1 to 500 parts per 100 parts of conventionally prepared oxymethylene polymer. Starting from at least 5% of low molecular weight fraction in the base polymer, an oxymethylene polymer having a low molecular weight fraction in the range of at least 6% to 84% in the polymer is thus described. For the most part, this low molecular weight fraction comprises linear polymers.

It is an object of the present invention to provide selected oxymethylene polymers which can be processed by means of shaping processes known per se to give moldings which are distinguished by a very high low-temperature notched impact strength and further increased modulus of elasticity.

The present invention relates to oxymethylene polymers which are homopolymers or copolymers in which the molar ratio of comonomer units to oxymethylene units is less than 0.008, which have an at least bimodal molecular weight distribution and in which the proportion of low molecular weight oxymethylene polymers having molecular weights below 10,000 Dalton is from 1 to 5% by weight, based on the total mass of the oxymethylene polymers. Preferably, the molar ratio of comonomer units to oxymethylene units is from 0.0004 to 0.005.

Particularly preferably, the oxymethylene polymers according to the invention have a proportion of terminal alkyl ether groups, based on all terminal groups, of at least 70%.

The proportion of low molecular weight oxymethylene polymers having molecular weights below 10,000 Dalton is from 1 to 5% by weight, based on the total mass of the oxymethylene polymers, in the case of the oxymethylene polymers according to the invention. The low molecular weight fraction preferably comprises more than 50% by weight, particularly preferably more than 80% by weight, of cyclic polyoxymethylenes. The distinction between linear and cyclic fraction can be made by means of MALDI-TOF-MS (Matrix Assisted Laser Desorption Ionization—Time of Flight Mass Spectrometry).

The oxymethylene polymers according to the invention have an at least bimodal molecular weight distribution. This is preferably a bimodal distribution but may also be distributions having a higher modality.

In a preferred embodiment, the product contains from 0.04 to 0.5 mol %, based on oxymethylene units, of the structure $$-O-(CH_2)_x-,$$

in which x is an integer from 2 to 8.

The oxyalkylene unit $-O-(CH_2)_2-$ is particularly preferred.

The molecular weights, characterized as melt volume rate MVR, of these polymers can be adjusted within wide ranges. Typical MVR values are from 0.1 to 100 g/10 min, preferably from 1 to 80 g/10 min, particularly preferably from 2 to 20 g/10 min, measured according to EN ISO 1133 at 190° C. under a load of 2.16 kg.

Products according to the invention can be prepared, for example, by adding a cationic initiator to a mixture of the monomers (preferably trioxane and dioxolane) and the molecular weight regulator (preferably methylal) at temperatures above 65° C. in a gas-tight polymerization reactor. The reaction mixture warms up as a result of the heat of crystallization of the precipitating polymer. If appropriate, further heat can be supplied so that a specified temperature profile (polymerization temperature as a function of the polymerization time) T=f(t)) can be established. The temperature profile can be established so that the reaction mixture is homogeneous again at the end of the polymerization. By addition of a basic component (for example triethylamine) to the homogeneous melt, the polymerization is stopped. Since the low molecular weight fraction forms at the beginning of the precipitation polymerization and disappears again in the polymerization-active melt, the content of the low molecular weight fraction can be adjusted in a targeted manner from 1% by weight to 5% by weight by the time of addition of the basic component or by the temperature profile of the polymerization. Thereafter, the crude polymer is worked up, any unstable terminal hemiacetal groups present are degraded by hydrolysis and compounding and fabrication are effected. These process steps are known to the person skilled in the art.

If desired, small amounts of branching agents can be used. Usually, the amount of branching agents is not more than 1% by weight, based on the total amount of monomers used for the preparation of the oxymethylene polymers, preferably not more than 0.3% by weight. Preferred branching agents are polyfunctional epoxides, polyfunctional glycidyl ethers or polyfunctional cyclic formals.

Preferred chain-transfer agents (regulators) are compounds of the formula I $$R^1-(-O-CH_2)_r-O-R^2 \qquad (I),$$

in which $R^1$ and $R^2$, independently of one another, are linear or branched alkyl radicals, in particular $C_1$-$C_6$-alkyl radicals, which are preferably straight-chain.

Particularly preferably, $R^1$ and $R^2$, independently of one another, are methyl, ethyl, propyl or butyl, in particular methyl.

r is an integer and may assume values from 1 to 9.

Particularly preferred chain-transfer agents are compounds of the formula I in which r is 1, very particularly preferably methylal.

For the targeted production of terminal OH groups in the polymer, it is also possible to use chain-transfer agents which transfer protons. Examples of this group are water, formic acid, monohydric and polyhydric alcohols, such as methanol, ethanol, ethylene glycol, butanediol, glycerol or 1,1,1-trimethylolpropane. By using these protic transfer agents, firstly a certain proportion of unstable terminal hemiacetal groups which lead to stable terminal alkylene-OH groups in the subsequent hydrolysis are produced. Preferred transfer agents are polyhydric alcohols.

The chain-transfer agents are usually used in amounts of up to 20,000 ppm by weight, preferably from 100 to 5,000 ppm, particularly preferably from 200 to 2000 ppm, based on the monomer mixture.

Initiators which may be used are in particular strong protic acids, such as fluorinated or chlorinated alkylsulfonic acids and arylsulfonic acids. Examples of these are trifluoromethanesulfonic acid or derivatives thereof, such as esters or anhydrides of protic acids, in particular trifluoromethanesulfonic anhydride or trifluoromethanesulfonic esters, such as the alkyl esters. Also suitable are perchloric acid and esters thereof. According to the invention, initiators are those compounds which initiate the polymerization in concentrations of $<10^{-4}$ mol %. In principle, it is also possible to use Lewis acids, such as, for example, $BF_3$ or $BF_3$ etherates, as initiators, but in somewhat higher concentrations.

Alternatively, the polymers according to the invention can be prepared by mixing oxymethylene polymers having a monomodal distribution and conventional oxymethylene polymers having a bimodal distribution or a distribution of higher modality, which oxymethylene polymers contain from 5 to 15 percent by mass of low molecular weight fraction. Polyoxymethylene polymers having a monomodal distribution are described in EP 0716 105. In the context of this description, oxymethylene polymers having a monomodal distribution are understood as meaning those polymers which have only one peak in the molecular weight distribution, this peak being present above 10,000 Dalton, preferably from 30,000 to 200,000 Dalton.

It is also possible to obtain the polymers according to the invention by separating off the low molecular weight fraction by fractionation in the case of polymers having a bimodal distribution and polymers having a higher modality.

The moldings produced from oxymethylene polymers according to the invention which are obtained in this manner have outstanding low-temperature notched impact strengths and high moduli of elasticity in combination with good chemical stability.

The shaping can be effected by known molding processes, for example by blow molding or by injection molding.

The invention also relates to the use of the oxymethylene polymers described above for the production of moldings having good low-temperature notched impact strength.

The following examples explain the invention without limiting it.

EXAMPLE 1

According to the Invention

The polymerization was carried out in a gas-tight, pressure-stable twin-screw extruder having 7 separately adjustable heating stages of approximately equal length (=zones 1 to 7). The starting compounds were metered in by means of HPLC pumps and mixed efficiently in the premixing zone by static mixing elements before they entered the extruder for polymerization. The deactivator used was a mixture of 0.2% by weight of triethylamine in 1,3-dioxolane. This solution was metered in between zones 5 and 6 at a delivery rate of 40 g/h.

4 kg/h of trioxane preheated to 80° C. and 40 g/h of methylal in which 300 ppm of trifluoromethanesulfonic acid and 600 ppm of triethylammonium hydrogen triflate were dissolved were pumped into the extruder at a shaft rotation speed of 120 rpm. The pressure was kept constant at 18 bar by a pressure control valve at the end of the extruder. The temperatures for the individual heating zones were as follows:

| | Zone: | | | | | | |
|---|---|---|---|---|---|---|---|
| | 1 | 2 | 3 | 4 | 5 | 6 | 7 |
| Temperature in ° C.: | 110 | 120 | 135 | 150 | 160 | 170 | 170 |

The residence time in the extruder was about 1 min. The polymers were discharged as a melt and collected in a receiving vessel. After cooling, polymer samples were dissolved in dimethylacetamide (=DMAc) at the boiling point and boiled for about 1 h in order to remove unstable chain ends. The polymers precipitated after cooling were boiled twice in methanol, filtered and dried. The molecular weight distribution of the polymer had a low molecular weight fraction of 3% by weight.

Comparative Examples 2 to 4

As Comparative example 2, the oxymethylene polymer of Example 1 of EP 716,105 was reproduced.

The oxymethylene polymer of Comparative example 3 was prepared as follows: 0.1 ml of a solution of trifluoromethanesulfonic acid (200 ppm) in methylal was added to a mixture of 100 g of 1,3,5-trioxane and 0.7 g of 1,3-dioxolane at 100° C. with stirring. The reaction product which was solid after a reaction time of about 5 min was dissolved in DMAc at the boiling point and refluxed for 1 h in order to remove unstable chain ends. The polymer precipitated after cooling was boiled twice in methanol, filtered and dried.

As Comparative example 4, the commercial product Delrin® 100P was used and characterized.

Details of the samples investigated are to be found in the table below.

| Example no. | Low molecular weight fraction (% by weight) (*) | Comonomer content (mol %) | Melt volume rate MVR190/ 2.16 (ml/ 10 min) | Tensile modulus of elasticity (MPa) | Notched impact strength −30° C. (kJ/m²) |
|---|---|---|---|---|---|
| 1 | 3 | 0.28 | 2.1 | 2900 | 13 |
| 2 | 0 | 0.55 | 2.4 | 2800 | 13.2 |
| 3 | 12 | 0.28 | 2 | 2850 | 9.1 |
| 4 | 0 | 0 | 2.5 | 2645 | 13.5 |

(*): the low molecular weight fraction in % by weight was calculated from the ratio of the peak areas of the corresponding GPC curves. The GPC measurements were carried out in hexafluoroisopropanol and PMMA was used as a standard.

Example 5

Separation of the Low Molecular Weight Constituents from Oxymethylene Polymers 4 g of oxymethylene polymer having a melt volume rate of 2.5 ml/10 min and a proportion of low molecular weight fractions of 10% by weight were heated to 170° C. in 40 g of a mixture of 85% by weight of methanol, 15% by weight of water and 500 ppm of triethylamine for 10 min in an autoclave with stirring. After cooling to room temperature (without stirring), the supernatant turbid liquid was separated from the coarse polymer particles lying on the bottom by simple decantation. After drying, the coarse polymer particles had a weight of 3.4 g and possessed a low molecular weight fraction of 5% by weight.

The invention claimed is:

1. An oxymethylene polymer which is a homopolymer or copolymer in which the molar ratio of comonomer units to oxymethylene units is less than 0.008 and which has an at least bimodal molecular weight distribution, wherein the proportion of low molecular weight oxymethylene polymers having molecular weights below 10,000 Dalton is from 1 to 5% by weight, based on the total mass of the oxymethylene polymer the oxymethylene polymer being formed by a process wherein a monomer that forms formaldehyde units is combined optionally together with a comonomer that forms C—C units and together with a chain-transfer agent and a cationic polymerization initiator to form a polymerization mixture in such a way that first a precipitation polymerization is effected homogeneously and, following a period of time the first polymerization is stopped by addition of a basic compound, a temperature profile of the first polymerization being adjusted the period of time being selected so as to stop the first polymerization so that the oxymethylene polymer has a content of low molecular weight constituents of from 1 to 5% by weight.

2. The oxymethylene polymer as claimed in claim 1, wherein the molar ratio of comonomer units to oxymethylene units is from 0.0004 to 0.005.

3. The oxymethylene polymer as claimed in claim 1, which has a proportion of terminal alkyl ether groups, based on all terminal groups, of at least 70%.

4. The oxymethylene polymer as claimed in claim 1, which contains at least 70% of polymers of the general formula

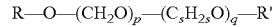

in which R and R' are alkyl radicals, s is an integer from 2 to 10 and p and q are averaged random fractions of the comonomers, q/p being less than 0.008.

5. The oxymethylene polymer as claimed in claim 1, wherein the low molecular weight constituents comprise more than 50 percent by mass of cyclic oxymethylene polymers.

6. The oxymethylene polymer as claimed in claim 1, wherein the low molecular weight constituents comprise more than 80% by mass of cyclic oxymethylene polymers.

7. The oxymethylene polymer as claimed in claim 1, wherein the molecular weight distribution of the low molecular weight oxymethylene polymers having molecular weights below 10,000 Dalton has a polydispersity $M_w/M_n$ of <1.5.

8. The oxymethylene polymer as claimed in claim 1, wherein the comonomer units are —O—$(CH_2)_2$—.

9. A molding having good low-temperature notched impact strength comprising the oxymethylene polymer of claim 1.

10. The oxymethylene polymer as claimed in claim 1, wherein the molecular weight distribution of the low molecular weight oxymethylene polymers having molecular weights below 10,000 Dalton has a polydispersity of $M_w/M_n$ of <1.2.

11. The oxymethylene polymer as claimed in claim 1, wherein the oxymethylene polymer is formed according to a process in which polymerization is stopped by the addition of a basic component to a reaction mixture.

12. The oxymethylene polymer as claimed in clam 1, wherein the proportion of low molecular weight oxymethylene polymers having molecular weights below 10,000 Dalton is adjusted by time of addition of a basic component to a reaction mixture during formation of the oxymethylene polymer.

13. The oxymethylene polymer as claimed in claim 1, wherein the proportion of low molecular weight oxymethylene polymers having molecular weights below 10,000 Dalton is adjusted by control of a temperature profile of a reaction mixture during formation of the oxymethylene polymer.

14. The process of claim 1, wherein the monomer forming formaldehyde units is trioxane.

* * * * *